United States Patent [19]

Wisdom et al.

[11] 4,041,460
[45] Aug. 9, 1977

[54] MULTI-PROCESSOR DATA PROCESSING SYSTEM PERIPHERAL EQUIPMENT ACCESS UNITS

[75] Inventors: Graham John Wisdom; Peter Verne Creteau, both of Wimborne; John Lloyd Williams, Cambridge, all of England

[73] Assignee: Plessey Handel und Investments AG., Zug, Switzerland

[21] Appl. No.: 686,925

[22] Filed: May 17, 1976

[30] Foreign Application Priority Data

May 17, 1975 United Kingdom ............... 21061/75

[51] Int. Cl.² .......................................... G06F 11/06
[52] U.S. Cl. ............................ 364/900; 235/153 AM; 340/146.1 BA
[58] Field of Search .................. 340/172.5, 146.1 BA; 235/153 AH, 153 AM

[56] References Cited

U.S. PATENT DOCUMENTS

| 3,251,038 | 5/1966 | Rakoczi | 340/172.5 |
| 3,340,506 | 9/1967 | Mayer | 340/146.1 BA |
| 3,411,137 | 11/1968 | Howells | 340/172.5 |
| 3,631,401 | 12/1971 | Dinman | 340/172.5 |
| 3,665,393 | 5/1972 | Brune | 340/146.1 BA |
| 3,893,072 | 7/1975 | D'Antonio | 340/146.1 BA |

*Primary Examiner*—James D. Thomas
*Attorney, Agent, or Firm*—Fleit & Jacobson

[57] ABSTRACT

Each store and peripheral unit in system 250 is connected to the processor buses and includes an interface access-unit which makes each device appear the same to the or each processor. Essentially each access-unit includes a module-address register, a data-in register and/or a data-out register, a status register and a command register. The module-address register is used to receive and store the address received by the access-unit when addressed by an interrogating processor. The module address register is addressable by an interrogating processor using one of two "addresses". One address causes the contents of the module address register to be returned to the interrogating processor while the other "address" causes the inverse of the contents of the module address to be returned to the interrogating processor. This arrangement makes it possible to completely check a processor bus using only two transactions.

1 Claim, 5 Drawing Figures

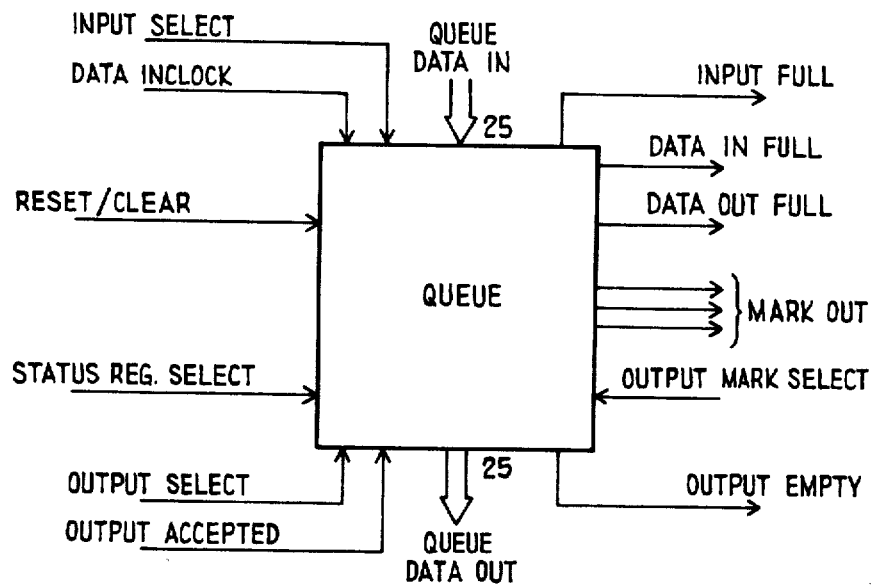
Fig. 3
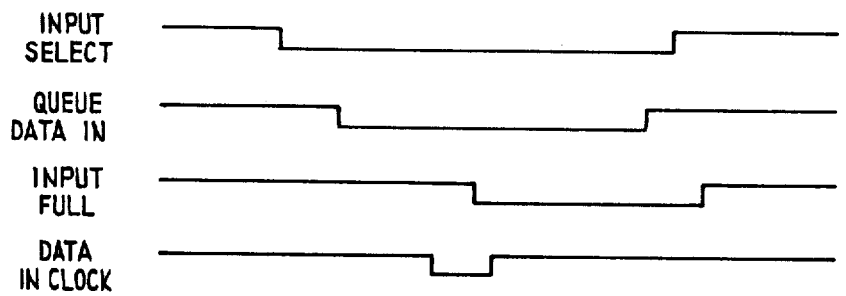
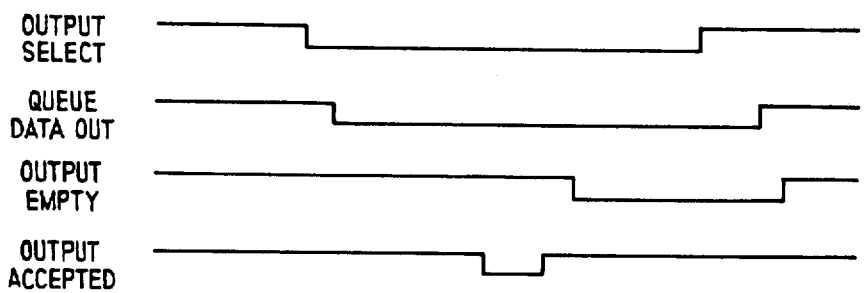
Fig. 4

MULTI-PROCESSOR DATA PROCESSING SYSTEM PERIPHERAL EQUIPMENT ACCESS UNITS

The present invention relates to multi-processor systems of the type disclosed in British patent specification No. 1,394,431 and corresponding U.S. Pat. No. 3,787,818, and is more particularly concerned with so-called access units for use with storage modules and peripheral equipment of such systems.

In multi-processor systems of the type to which the invention relates each peripheral equipment and each memory module is provided with an individual access unit and each processor module is provided with its own unique data communication path which is connected to an individual port on each access unit. Each access unit is conditioned with a system identity number of the equipment (peripheral equipment or storage module) it serves and the unit includes an identity address recognition comparator. Each peripheral equipment access unit includes a number of processor addressable registers and a register selection arrangement. The register selection arrangement is used to select which processor addressable register is to be used on a communication path transaction. Processor module access to a peripheral equipment is performed by extending, on the processor modules own communication path, an address comprising at least two fields. The first address field defines the peripheral equipment within the overall system and is active upon the identity address recognition comparator in the access unit of the relevant peripheral equipment. The second field defines the addressable register with which the processor module transaction is required.

The present invention relates to an access unit for use in a multi-processor data processing system of the type defined in the above paragraph.

It is an object of the present invention to extend the facilities of such an access unit.

According to the invention there is provided an access unit for use in a multi-processor data processing system of the type defined which access unit includes an address monitor register into which address information received from a processor communication path is written and the address monitor register is selectable by either of two unique identities which when received in the second address field by the register selection arrangement in the access unit causes the access unit to return either the information in the address monitor register or the inverse to the processor module addressing the access unit.

The invention together with its various features will be more readily understood from the following description of one embodiment thereof which should be read in conjunction with the accompanying drawings.

Of the drawings:

FIG. 2 shows in block diagram form the equipment provided in an access unit according to the invention for use with a peripheral equipment while FIG. 3 shows additional queue handling facilities which may be provided in an extended access unit of FIG. 2.

FIG. 4 shows timing diagrams of input and output queue operations and

Figure 1:
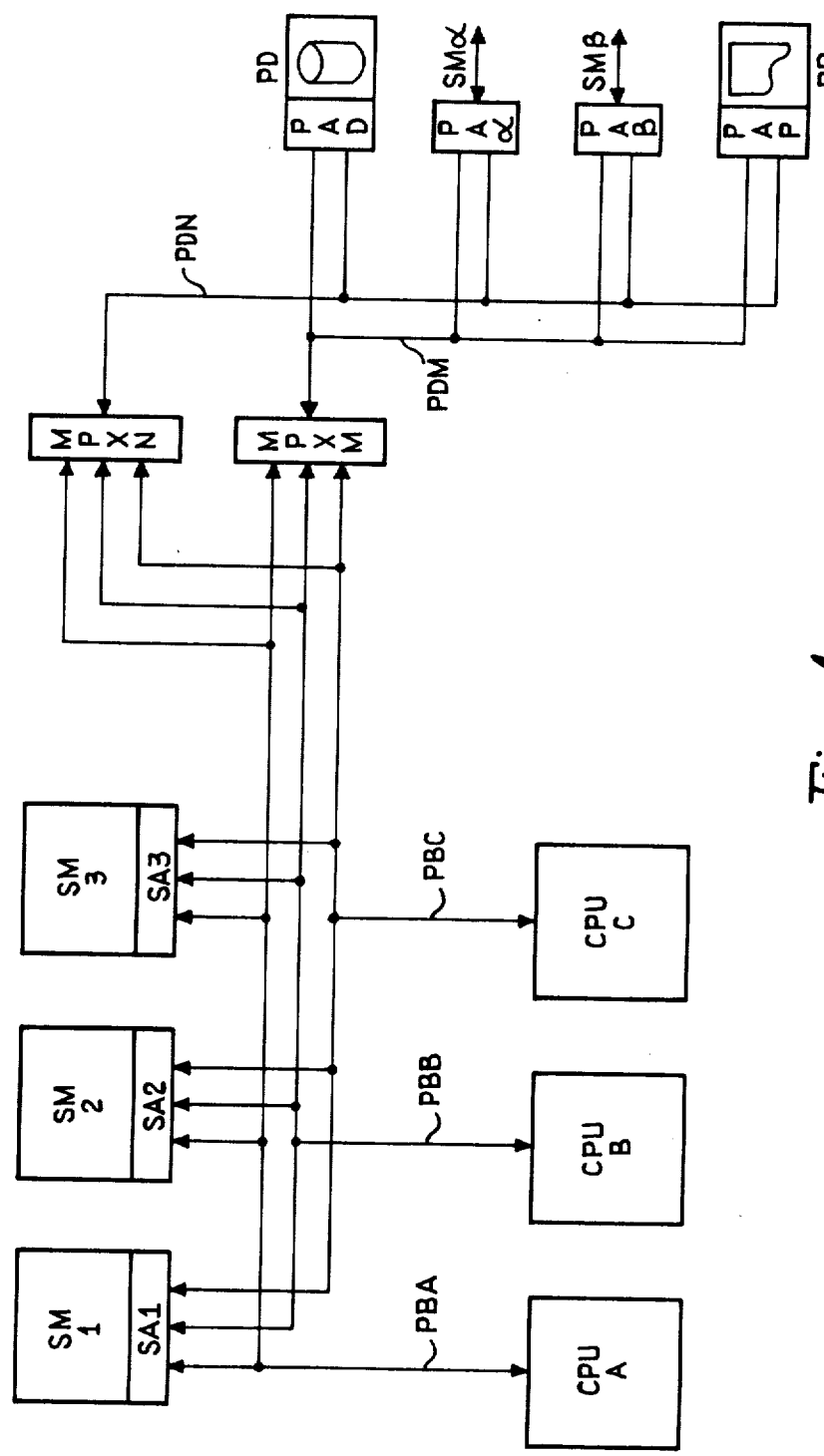
FIG. 1 shows a block diagram of a typical multi-processor system in which the invention may be employed.

Considering firstly FIG. 1 it will be seen that the modular data processing system of the embodiment of the invention includes (i) a number of peripheral equipments such as PD representative of bulk storage equipment such as magnetic drums or discs, a page printer PP and a group of serially activated peripheral equipments served by these SM$\alpha$ and SM$\beta$, (ii) three memory modules SM1, SM2 and SM3, (iii) three processor modules CPUA, CPUB and CPUC and (iv) a pair of multiplexors MPXN and MPXM.

Each processor module is provided with a discrete communication path or bus (PBA, PBB and PBC respectively for processor modules CPUA, CPUB and CPUC). Each processor module bus is terminated upon a separate port of (i) each storage module access unit (SA1, SA2 and SA3) and (ii) each multiplexor MPXN and MPXM. Each multiplexor multiplexes the demands on the peripheral buses on to single peripheral data bus shown as PDN and PDM. The multiplexors are provided to isolate peripheral expansion from the processor modules CPUA, CPUB and CPUC. In smaller systems the buses PBA, PBB and PBC could easily be directly connected to three-input-port peripheral access units and the multiplexors MPXN and MPXM could be omitted.

All the access units and the multiplexor modules are provided with the facility of recognising coded address information when applied to the buses terminated upon their input ports. The storage module access units (SA1, SA2 and SA3) and the multiplexors PXN and PXM are very similar in construction, one giving access to a storage module where the other gives access to a peripheral bus. Both types of units include facilities for queuing demands in priority order. Each peripheral equipment access unit PAD, PA$\alpha$, PA$\beta$ and PAP functions in a similar manner to a store access unit giving address access to a smaller number of peripheral equipment administration registers which typically, as mentioned previously, may include command, status, data-in and data-out registers.

Figure 2:
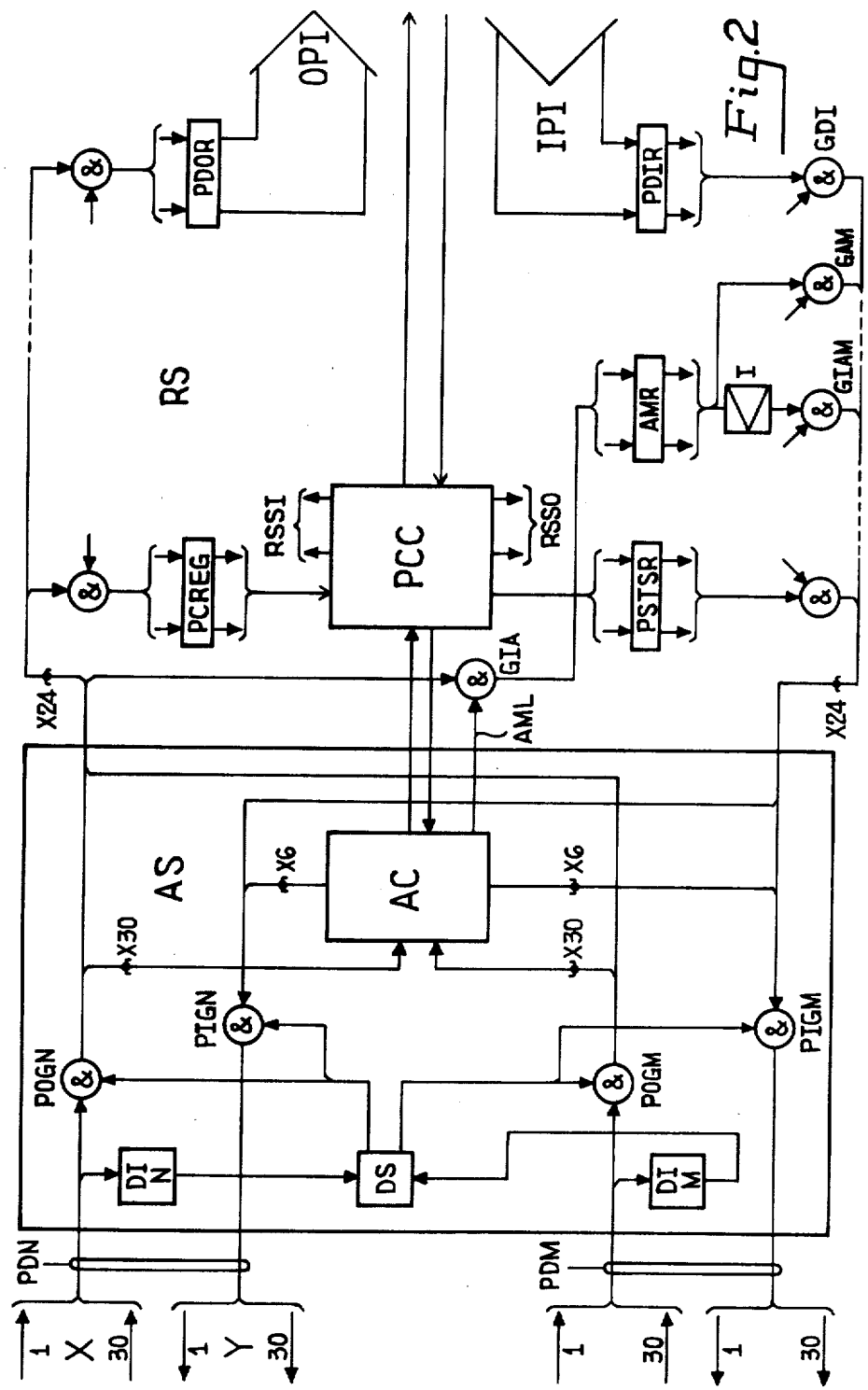

Referring now to FIG. 2 a broad outline of the equipment provided in a peripheral equipment access unit will be considered. The actual full range of equipment provided for each peripheral equipment will depend upon the facilities required and provided by the particular peripheral equipment served by that access unit. Basically the access unit consists of an access section AS and an adminstration register section RS. The access section terminates the two peripheral buses PDN and PDM and provides input and output coding (PIG and POG respectively) together with demand interrogation logic (DIN and DIM) for each peripheral bus. The demand interrogation logic is connected to a demand sorting circuit DS which resolves concurrent demands and operates the selected input and output gating arrays.

Before considering the access unit in any further detail consideration of the configuration of buses PDN and PDM will be given. Each bus consists of 30 leads in each direction and these have been shown as X and Y relevant to bus PDN in FIG. 2. The X bus carries signals which are transmitted by a processor module whereas the Y bus carries signals that are transmitted by the access unit. Each group of 30 signals leads is divided into information and supervisory sections.

X BUS

In the X or forward going direction 24 information signal paths are provided to carry both address and data words in successive timing periods during a write cycle. The remaining six paths of this are used to carry control signal information and these paths are segregated into separate control functions of parity, bus valid, transfer timing and command. A single parity path is provided and it carries an indication of the type of parity (i.e. odd or even) to be generated in the access unit. The bus valid path is used to indicate that the data paths and command paths are carrying valid data rather than noise. The command function uses three paths in a linearly coded fashion. These command paths control the operation (read, read-and-holed, write or reset) as required for each access unit transaction. The relevant command codes are binary coded so that decimal 1 defines read, decimal 2 defines read-and-hold, decimal 4 defines write and any other decimal code defines reset.

Finally a timing path is included in the X bus which is used to strobe the information on the remaining 29 signal paths into the access unit.

Y BUS

In the Y or backward direction again 24 information signal paths are used to carry data on read operations from the access unit to the interrogating processor. The six additional paths in this case, however, carry response signals defining (i) Read data parity, (ii) the accumulated parity, (iii) a peripheral register busy indication, (iv) a peripheral status fault indication, (v) a return timing pulse and (vi) a valid operation (or cycle) signal. The "stored parity" signal indicates the value of the parity bit generated by the access unit to accompany the data word passed to the processor in a read operation. The "accumulated parity+ signal returns an accumulated check bit constricted as odd parity over the successive forward data and parity control paths during a write access. The "register busy" signal is used to indicate that the actual peripheral equipment has not yet completed a previously called for transaction. The "status fault" signal is used to indicate to the processor that a fault condition has occurred within either access unit or the associated peripheral equipment. The "timing" wire carries a timing signal generated by the access unit to indicate to the processor that the demand for access has been accepted while the valid operation signal acknowledges to the processor the acceptance of the demand and the control code by the access unit during each cycle.

The control signal and response signal paths of the X and Y buses terminate in the access unit on an access control circuit AC which is used to synchronise the execution of the chosen transaction cycle such as read, read-and-hold, write or reset as defined by the state of the control signal paths on the X bus. The access control circuit also includes timing pulse generation equipment for the transmission of command address data and parity signals into the administration register section RS of the access unit. The access control circuit AC also includes arrangements for the reception of timing and control signals from the administration register section control circuit PCC.

The administration register section RS is particular to the peripheral device it is associated with and leads OPI and IPI indicate the output and input paths respectively connecting the access unit with the associated peripheral equipment. Each peripheral equipment access unit, however, is provided with at least four or five administration registers. These are a command register PCREG, a status register PSTSR, an address monitor register AMR and either or both data handling registers PDIR (the date-in-register) and PDOR (the date-out register). All these registers and any other particulars of the peripheral device are addressable by the control system and the received register address is passed by the access control unit AC to the control circuit PCC. The reception of the second address field by the control circuit PCC causes the relevant selection lead in the groups shown as RSSI and RSSO in FIG. 2 to be activated. Consideration will now be given to the basic register-set as defined above.

The data-in register PDIR is provided if the peripheral equipment is capable of generating input information to the computer system and the register is loaded by the peripheral equipment when that equipment generates an output data word. When the data-in register has been loaded the indication bit (full/empty) is set in the status register PSTSR so that the computer system may be informed that information is available for input. The data-in register may be equipped with byte assembly arrangements allowing byte producing peripheral equipment to be matched to the 24 bit processor module data word.

The data-out register PDOR is provided if the peripheral equipment is capable of receiving output information from the computer system. This register will also have a full/empty indicator bit in the status register which is used to indicate when the associated peripheral equipment has removed completely the data word from the data-out register.

The command register PCREG contains indicators which are written to by the computer system to control the functions performed by the associated peripheral equipment. Typically the command indicators may include (i) an out-of-service indicator, (ii) a stop indicator (iii) a general reset indicator and (iv) a fault bit reset indicator. Other indicators will be provided according to the requirements of the particular peripheral equipment.

The status register PSTSR contains indicators which may be read by the computer system to ascertain the current state of the associated peripheral equipment. Typically the status indicators may comprise a copy of all the current states of the command indicators and also may include (a) an out-of-service indicator (b) an off line indicator (c) a stopped indicator and (d) a fault indicator. Other indicators showing the results of various commands will also be provided in the status register in accordance with the functioning of the particular peripheral equipment. As already mentioned the data-in and data-out registers are provided with full/empty indicators in the status register and if other administration registers are provided corresponding full and empty indicators may be required.

The address monitor register AMR is used to hold the received address (both fields) on all addressing operations. The 24 bits of the address information will be gated by gates GIA in FIG. 2 upon the production of the address monitor lead AML by the access control circuit AC. The address monitor register AMR may be addressed by two separate system addresses. These two system addresses identify (i) the address monitor contents or (ii) the inverse of the address monitor register contents. The contents of the address monitor register will be inverted by the invertor I diagrammatically shown on the single output lead from this register when the second field of the address defines a read from inverse monitor address. This second field is active in the adminitration register control circuit PCC to activate gates GIAM or GAM and accordingly the actual or inverse of the received address would be returned to the interrogating processor. The provision of the inverse address monitor register AMR provides a very important diagnostic facility in that by reading from the address monitor registers the stored address and its inverse a processor can check that all the Y going data paths are functioning correctly. Accordingly by performing such operations on all the access units connected to a processor bus any discrepancies can easily be diagnosed. When a discrepancy occurs the situation can be diagnosed depending upon whether the "fault" condition is detected on one, some or all of the access unit operations. Further after a "bus test" of this nature any further problems that a processor experiences in communicating with an access unit can be routined while its peripheral is being run normally.

A processor bus failure would be detected if the returned addresses of two operations were both corrupted in the same bits. If similar bit pattern corruptions are not detected for the two returned addresses then the possibilities are that the failure is in the access unit of that returning a corrupted inverse address.

The use of the "inverse" address ensures that the bus is "exercised" fully during the diagnostic "read from address monitor register⇄ operation. Typically any bus data lead struck at 1 or 0 will corrupt the opposite bit and the returned inverse address will not be correct.

Consideration will now be given to the incorporation of queuing facilities in the access unit. The queue function is shown in FIG. 3 in block form and is a self contained data handling unit which has the purpose of interfacing data between two asynchronous systems. It accepts data from the processing system of peripheral equipment and makes it available to the peripheral equipment, or the processing system. The queue function is divided into two sections comprising input and output and each section includes a first-in first-out stack data store.

1. INPUT QUEUE FUNCTION INTERFACE

The following signals specify those relevant to the input queue function.

Input Select

The INPUT SELECT line must go low in order to enable information on the 25 QUEUE DATA-IN lines to be recorded within the queue function on the occurrence of the associated DATA-IN clock pulse.

Queue Data-In Bus

The date to be input to the queue is carried on the 25 QUEUE DATE-IN lines.

Input Full

The INPUT FULL signal is higher when the INPUT SELECT line is high.

When the INPUT SELECT line is low, a low condition on INPUT FULL indicates that information has been stored in the queue function; a high condition indicates that the queue function is ready to accept new information.

INPUT FULL goes low as a result of a DATA-IN CLOCK pulse which occurs while the INPUT SELECT line is low, and subsequently goes high, providing the queue is not full, and stays high until another DATA-IN CLOCK pulse occurs while INPUT SELECTED is low.

Several INPUT FULL lines may be connected to form a wired-OR function.

Data-in Clock

The DATA-IN CLOCK terminates the instant during the INPUT SELECT enabling period at which the data on the 25 QUEUE IN lines is recorded.

Any attempt to record data within the queue when INPUT FULL is low results in a loss of information.

Data-in Full

The DATA-IN FULL signal is output on the command STATUS REGISTER SELECT. It is necessary that, during the period when DATA-IN FULL is enabled by STATUS REGISTER SELECT, the output of the former should remain unchanged irrespective of the status of the queue. It should only follow the status of the queue when STATUS REGISTER SELECT does not enable its output. The DATA-IN FULL line may be connected to form a wired-OR function.

Status Register Select

The STATUS REGISTER SELECT SIGNAL is a negative going signal which enables the outputs of DATA-IN FULL and DATA-OUT FULL.

OUTPUT QUEUE FUNCTION INTERFACE

The following signals specify those relevant output queue function.

Output Select

The output select line must go low in order to enable the OUTPUT EMPTY signal and the 25 QUEUE DATA-OUT lines.

Output Empty

The OUTPUT EMPTY signal is high when the OUTPUT SELECT line is high. When OUTPUT SELECT is low OUTPUT EMPTY signifies by going positive that information is valid on the 25 DATA-OUT lines of the queue. The signal will remain in the high condition until the trailing edge of OUTPUT ACCEPTED is received. Subsequent to the clearing action of OUTPUT ACCEPTED, OUTPUT EMPTY will be high, provided the queue is not "Empty". Any attempt to read information from the queue when OUTPUT EMPTY is low results in invalid information. Several OUTPUT EMPTY lines may be connected to form a wired-OR function.

Queue Data-Out Bus

The 25 QUEUE DATA-OUT lines carry the information which is held in transit within the queue function when OUTPUT SELECT is enabled. The 25 QUEUE DATA-OUT lines may be connected to form a wired-OR function, and the information on the lines is in the same sense as that on the QUEUE DATA-IN lines.

Output Accepted

The OUTPUT ACCEPTED signal notifies the queue function by assuming a low state that the information on the QUEUE DATA-OUT lines has been accepted.

Data-Out Full

The DATA-OUT FULL signal is output on the command STATUS REGISTER SELECT. It is necessary that, during the period when DATA-OUT FULL is enabled by STATUS REGISTER SELECT, the output of the former should remain unchanged irrespective of the status of the queue. It should only follow the status of the queue when STATUS REGISTER SELECT does not enable its output. The DATA-OUT FULL line may be connected to form a wired-OR function.

Reset and Clear

The reset and clear pulse clears all binaries within the queue function, with the exception of the data storage area to the quiescent state.

Figure 5:
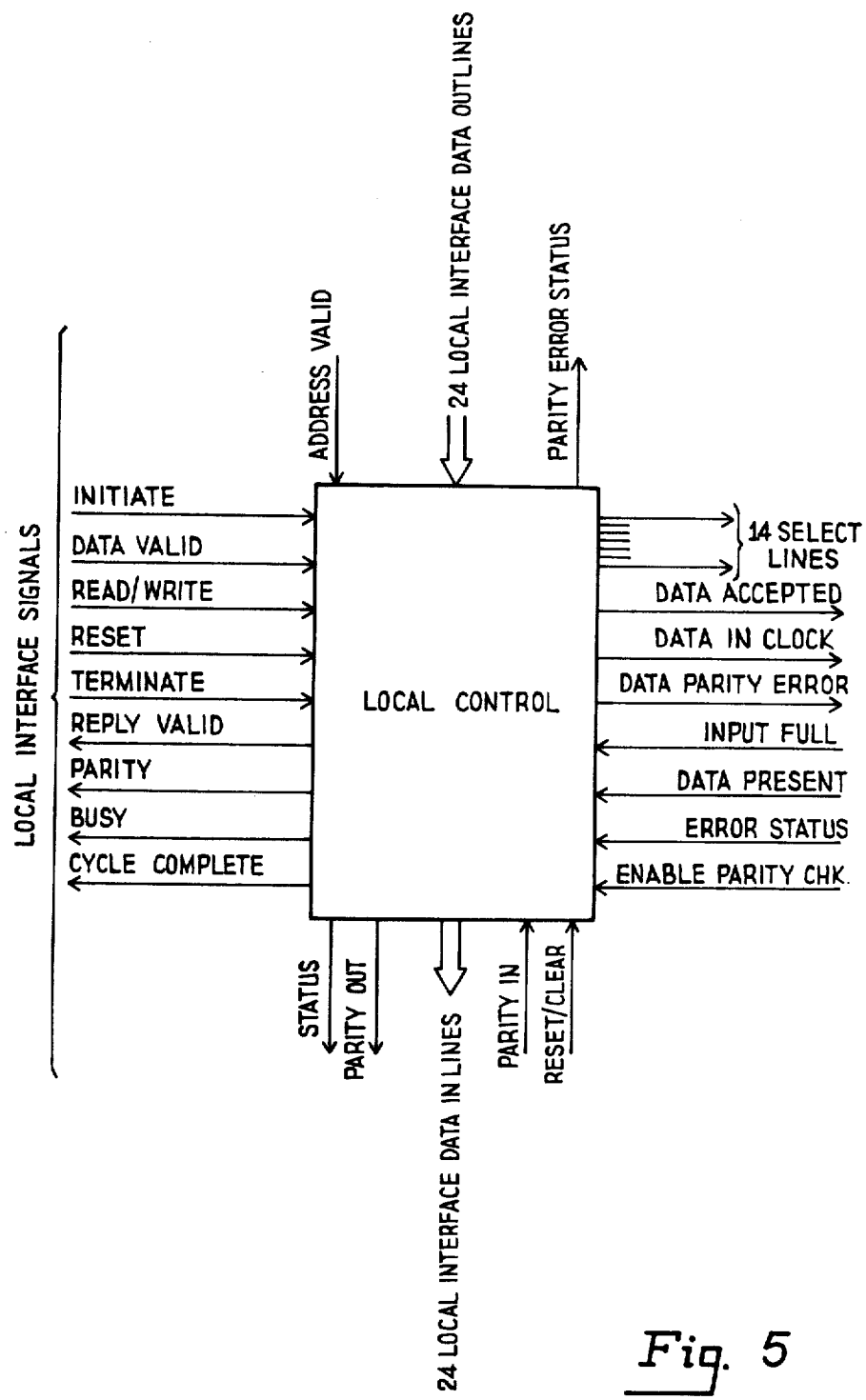
FIG. 5 shows the local control unit used to interface the normal administration register section conditions to the queue environment.

The local control unit shown in FIG. 5 provides the common features required in interface equipment to match peripheral equipment to the facilities of a normal access unit.

The following signals are required by the local control unit in addition to the local interface signals provided by paths OPI and IPI in FIG. 2. These signals are counted as local interface signals and are referenced LI in the following paragraphs.

LI DATA-OUT LINES

These carry the address information into the local control; the information is recorded when the address valid pulse occurs.

SELECT LINES

The 14 normally-high select lines are caused to go low one at a time depending on the address information received from the data-out lines in association with a local interface address valid pulse and remain low until the local interface terminate pulse occurs, when they return to the high state. They allow information to be recorded within or retrieved from register functions in the queue and device dependent unit, via the appropriate data lines.

INPUT FULL

This signal indicates the condition of the selected register's input full binary where such binary exists. It is normally high and goes low if a binary associated with the selected register is full.

DATA-IN CLOCK

The data-in clock records data in the queue or device dependent unit, depending on the state of the select lines.

LI DATA-IN LINES

These lines carry the information requested by the processing system. The lines are also used to carry data into the local control unit during read operations concerning register functions in the queue and device dependent unit, for the purpose of parity generation.

OUTPUT EMPTY

This signal indicates the condition of the selected register's output fill/empty indicator where such indicators exist.

It is normally high, and goes low if a binary associated with the selected register is set to empty.

DATA ACCEPTED

The data accepted signal informs a register function that its contents have been recorded elsewhere.

LOCAL INTERFACE BUSY SIGNAL

The LI busy line allows the processing system to determine whether a read or write operation was successful. It reflects the condition of OUTPUT EMPTY during read operations and INPUT FULL during the write operations concerning register Functions having full/empty binaries.

ENABLE PARITY CHECK

When in the high state this signal holds the DATA PARITY ERROR line high, and inhibits the setting of the error status bit. If it goes low before the front edge of REPLY VALID, it enables DATA PARITY ERROR and the error status bit.

PARITY IN

This line carries the parity bit associated with the information on the LI data-in lines during read operations concerning registers in the queue or device dependent unit, for the purpose of comparison with the parity bit generated in the local control.

PARITY OUT

This line carries a parity bit generated in the local control such that odd exists over this line and the 24 data-in lines.

DATA PARITY ERROR

This line signals by going low that the parity in and parity out conditions were different when the reply valid pulse occurred. The data parity error line must be maintained high if the ENABLE PARITY CHECK wire is high.

PARITY ERROR STATUS

This normally-high line reflects to the access unit the state of the data parity error line when the selected register is the status register. The parity error status line forms part of the distributed status register, and must, therefore, be suitable for connecting in a wired-OR configuration.

ERROR STATUS

This line goes low when the status register in the device dependent unit indicates that a fault condition exists. It can change state at any time except between address valid and terminate, i.e. during a local interface operation.

LOCAL INTERFACE STATUS WIRE

This local interface signal indicates that the error status or data parity error wire is low.

CHECK SELECT LINES

These four lines are used to detect the selection of a register "select line" which is invalid for the device being addressed. They show a pattern directly related to the highest address number used in the device.

CHECK ADDRESS VALID INPUT

This line will go low if the address is outside the range allowed by the second group of four least significant bits for the peripheral addressed. If only 16 addresses are being used, it will be connected to check address valid output. If more than 16 addresses are being used, then the signal will come in from the device dependent area instead.

What we claim is:

1. A data processing system comprising in combination a plurality of processor modules;

a plurality of data communication paths, one for each processor module allocated on a mutually exclusive basis and arranged to carry processor module generated address information;

a plurality of multi-port access units each including a data communication path selection and terminating means and an identity address recognition means conditioned with a unique identity code and responsive to the reception of said unique identity code within said address information when applied to any one of said data communication paths;

a plurality of memory modules each including an individual access unit and a group of peripheral equipments each including an individual access unit and each peripheral equipment access unit includes a plurality of processor module accessible registers and an unaccessible register selection means responsive to part of said address information, wherein the improvement comprises the provision in each access unit of an address monitor register into which the address information received from a processor module data communication path is written and said address monitor register includes first means for sending the address information received back to an interrogating processor module and second means for sending the inverse of the said address information received back to the interrogating processor module and said accessible register selection means is conditioned by the reception of a first register selection address to activate said first means and by the reception of a second register selection address to activate said second means.

* * * * *